United States Patent
Sellner et al.

(10) Patent No.: US 10,046,819 B1
(45) Date of Patent: Aug. 14, 2018

(54) THROWABLE ROBOT WITH CLAMSHELL BODY

(71) Applicant: ReconRobotics, Inc., Edina, MN (US)

(72) Inventors: Matthew M. Sellner, St. Louis Park, MN (US); Alex J. Kossett, Minneapolis, MN (US); Jade Moreau, San Francisco, CA (US); Andrew Drenner, Bloomington, MN (US); Steve Gigl, Crystal, MN (US)

(73) Assignee: ReconRobotics, Inc., Edina, MN (US)

( * ) Notice: Subject to any disclaimer, the term of this patent is extended or adjusted under 35 U.S.C. 154(b) by 0 days.

(21) Appl. No.: 14/747,817

(22) Filed: Jun. 23, 2015

Related U.S. Application Data

(60) Provisional application No. 62/015,889, filed on Jun. 23, 2014.

(51) Int. Cl.
  *B62D 57/02* (2006.01)
  *B62D 61/00* (2006.01)
  *B60K 1/02* (2006.01)
  *B60K 1/04* (2006.01)
  *B60R 16/023* (2006.01)

(52) U.S. Cl.
  CPC ............... *B62D 57/02* (2013.01); *B60K 1/02* (2013.01); *B60K 1/04* (2013.01); *B60R 16/0231* (2013.01); *B62D 61/00* (2013.01)

(58) Field of Classification Search
  CPC .......... B62D 57/02; B62D 61/00; B60K 1/02; B60K 1/04
  See application file for complete search history.

(56) References Cited

U.S. PATENT DOCUMENTS

| 2,818,301 A | 12/1957 | Hayden |
| 4,061,199 A | 12/1977 | Last |

(Continued)

FOREIGN PATENT DOCUMENTS

| EP | 1870254 | 12/2007 |
| FR | 2567078 | 1/1986 |
| WO | WO 02/24417 | 3/2002 |

*Primary Examiner* — Joseph M Rocca
*Assistant Examiner* — Maurice L Williams
(74) *Attorney, Agent, or Firm* — Christensen, Fonder, Dardi & Herbert PLLC

(57) ABSTRACT

A two wheeled throwable robot comprises an elongate chassis with two ends, a motor at each end, drive wheels connected to the motors, and a tail extending from the elongate chassis. The chassis split length wise and comprised of a pair of elongate portions, a rear portion and a forward portion. Adjoining respective surfaces with interfacing portions are sealed with a gasket or sealing material therebetween and provide a robust juncture. The rear portion having a deep recess and sub recess for containing and securing the pair of motors with brackets, and batteries with brackets. The forward part having a shallow recess with a pcb secured therein having control circuitry. The shallow component has a high degree of structural strength with a central region projecting forwardly and further having flattened forward facing end portions on each lateral side of the central region. The robot, even with the small size for throwability, also provides modularity allowing, for example, different motors and different radios to be changed out or allowing customized designs in a common chassis.

15 Claims, 6 Drawing Sheets

(56) References Cited

U.S. PATENT DOCUMENTS

| | | | |
|---|---|---|---|
| D338,474 S | 8/1993 | Christensen | |
| 5,487,692 A | 1/1996 | Mowrer et al. | |
| 5,871,386 A * | 2/1999 | Bart | A63H 15/06 446/443 |
| 6,502,657 B2 * | 1/2003 | Kerrebrock | B25J 9/08 180/218 |
| 6,548,982 B1 | 4/2003 | Papanikolopoulos et al. | |
| 6,824,508 B2 | 11/2004 | Kim et al. | |
| 6,860,346 B2 | 3/2005 | Burt et al. | |
| 6,902,464 B1 * | 6/2005 | Lee | A63H 5/00 446/409 |
| D540,503 S | 4/2007 | Tsang | |
| 7,249,640 B2 | 7/2007 | Horchler et al. | |
| D584,366 S | 1/2009 | Bowen et al. | |
| 7,559,385 B1 * | 7/2009 | Burt | B60K 7/0007 180/167 |
| 8,186,469 B2 * | 5/2012 | Yim | B25J 5/007 180/218 |
| 8,342,440 B2 * | 1/2013 | Papanikolopoulos | A63H 27/12 244/17.11 |
| 8,496,077 B2 * | 7/2013 | Nesnas | B25J 5/007 180/21 |
| 8,505,667 B2 * | 8/2013 | Kim | B60K 1/04 180/218 |
| 8,636,096 B2 * | 1/2014 | Kim | B25J 11/002 180/21 |
| 9,020,639 B2 * | 4/2015 | Bewley | B25J 5/005 700/250 |
| 2003/0038607 A1 | 2/2003 | Yim et al. | |
| 2003/0092964 A1 | 5/2003 | Kim et al. | |
| 2003/0137268 A1 * | 7/2003 | Papanikolopoulos | B62D 57/02 318/568.11 |
| 2008/0143065 A1 | 6/2008 | DeFazio et al. | |
| 2009/0099709 A1 | 4/2009 | Troy | |
| 2010/0032224 A1 * | 2/2010 | Liu | B25J 5/007 180/218 |
| 2010/0152922 A1 * | 6/2010 | Carlson | B62D 57/02 701/2 |
| 2010/0318059 A1 * | 12/2010 | Farritor | A61B 1/00156 604/500 |
| 2012/0059520 A1 * | 3/2012 | Kossett | B60B 1/042 700/264 |
| 2015/0175202 A1 * | 6/2015 | MacGregor | G05D 1/0011 701/2 |

* cited by examiner

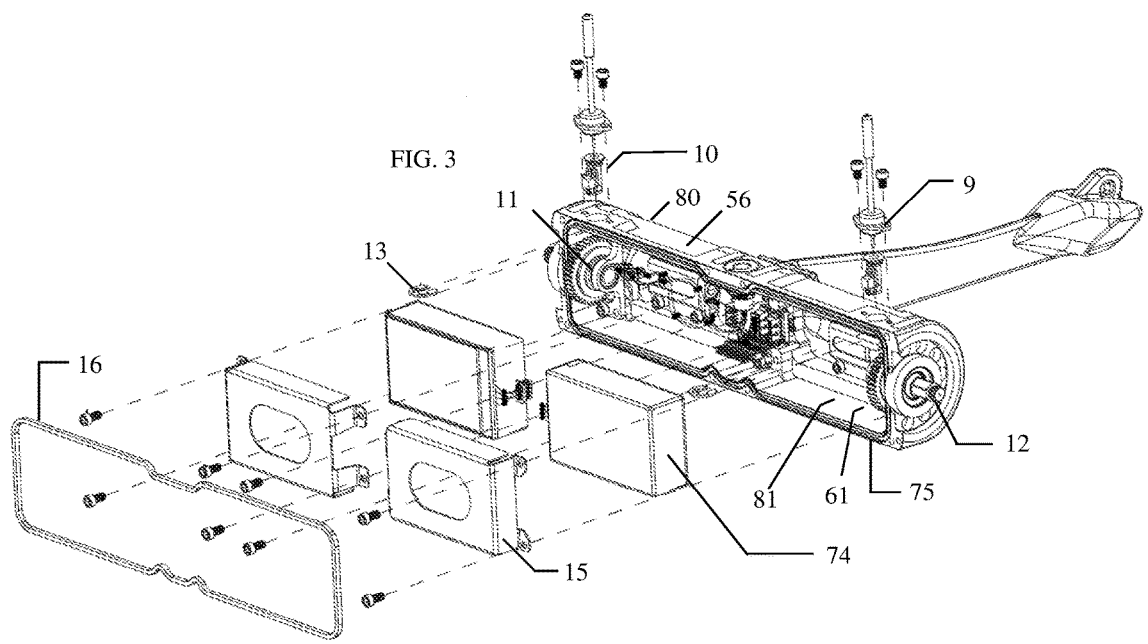

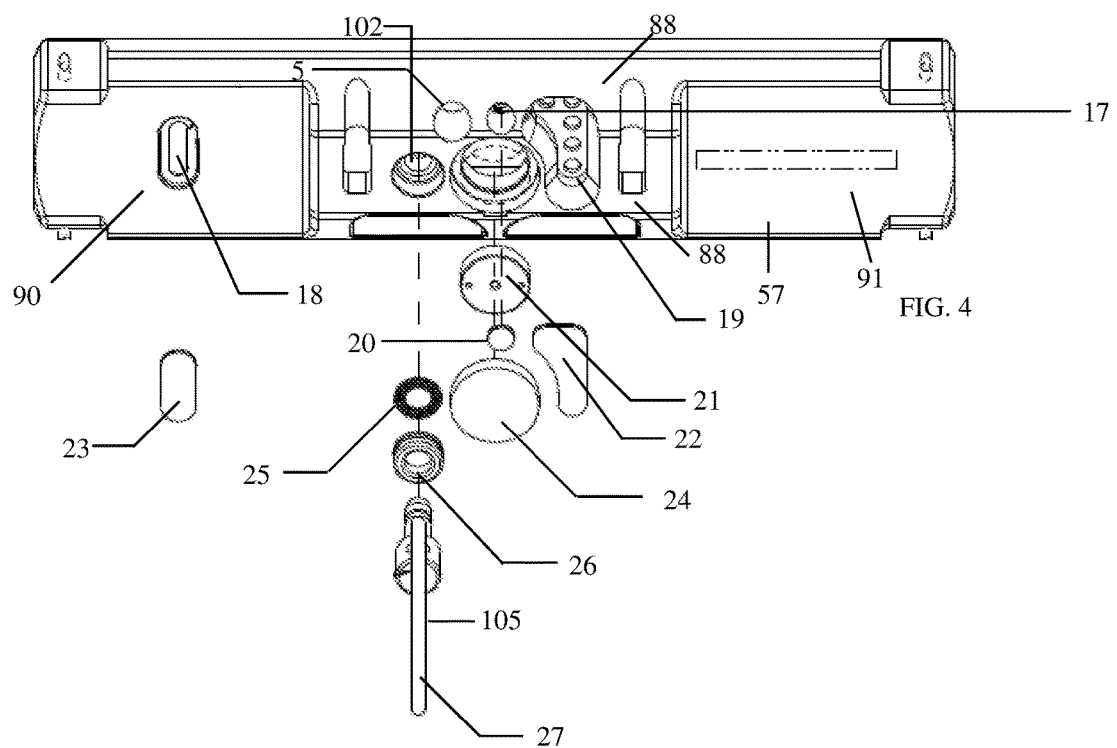
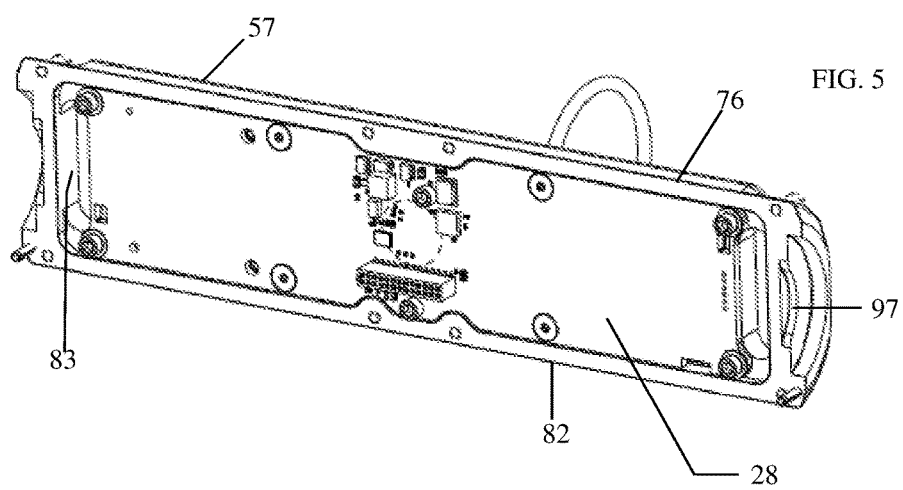

THROWABLE ROBOT WITH CLAMSHELL BODY

CROSS-REFERENCE TO RELATED APPLICATIONS

The present application claims the benefit of U.S. Provisional Application No. 62/015,889, filed Jun. 23, 2014, which is incorporated herein in its entirety by reference.

BACKGROUND OF THE INVENTION

Throwable robots for use in military police operations need to be highly durable and robust to reliably perform under difficult conditions. Ideally such robots can absorb substantial falls, and other shock conditions, moisture, and other contaminants. Any incremental improvements in reliability and performance for robots used in high stakes military and police operations are desirable.

Known two wheeled throwable robots are known and disclosed, for example, in U.S. D637217, Publication U.S.20100152922, the contents of which are incorporated by reference herein. Conventionally tubular bodies are utilized for the chassis of the robots.

SUMMARY OF THE INVENTION

A two wheeled throwable robot comprises an elongate chassis with two ends, a motor at each end, drive wheels connected to the motors, and a tail extending from the elongate chassis. The chassis split length wise and comprised of a pair of elongate portions, a rear portion and a forward portion. The rear portion having recesses and brackets for containing and securing the pair of motors, recesses defined at each end including at the motors for receiving a pair of batteries. Adjoining respective surfaces join with a gasket or sealing material therebetween.

The chassis is generally cylindrical with modified surfaces and is split, looking at an end, in a vertical chord forward of the axis of the modified cylinder. This provides a clamshell part with deeper recesses for the motors and batteries, the high volume components, and a shallow clamshell part that retains the main printed circuit board. A feature and advantage of the layout is the vulnerable PCB is secured in a shallow component that has a high degree of structural strength with a central region projecting forward and flattened forward facing end portions.

Moreover the rearward deeper clamshell part has two openings for the wheel shafts entirely contained within the ends of the deeper clamshell. Additionally, in embodiments, an annular bushing, unitary with the deeper clamshell part, is entirely included and extends towards and cooperatively engages the forward shallow clamshell part in recess. A feature and advantage of this structure is that it provides enhanced sheer resistance at the clamshell juncture whilst providing enhanced wheel shaft support.

A feature and advantage of embodiments is that even with the small size, modularity allowing, for example, different motors and different radios, has been built in.

A features and advantage of embodiments of the invention over known art throwable robots is that the assembly has a reduced mechanical part count resulting in reduced manufacturing costs.

A features and advantage of embodiments of the invention over known art throwable robots is increased internal volume for battery and motors with essentially the same size body as prior art robots.

A feature and advantage of embodiments of the invention over known throwable robots is greatly reduced number of interfaces to seal and sealing surfaces that are easier to seal. The design is believed to meet IP67 standard overall.

A feature and advantage of embodiments of the invention over known throwable robots is integration of the blister elements reduces the effective diameter which can decrease the likelihood of direct impact with the outer surface.

A feature and advantage of embodiments of the invention over known throwable robots is a novel motor mounting system which can accommodate more motors, and is more reliable.

A features and advantage of embodiments of the invention over known art throwable robots is a novel antenna mounting system which is waterproof and easily reconfigurable. Moreover, an embodiment formed of Nitinol is highly robust and returns to its original orientation.

A feature and advantage of embodiments of the invention over known throwable robots is support for conformal antennas is also in place.

A feature and advantage of embodiments of the invention over known throwable robots is that the chassis provides for modular radio support—the chassis readily receives and supports industry standard radios, enabling the robot to have digital, spread-spectrum, frequency hopping, encrypted and mesh radio communication. Also enables multiple data streams that can be turned on and off remotely. Further enables activation and deactivation of functionality (e.g. IR LEDs)

A feature and advantage of embodiments of the invention over known throwable robots is an Integrated digital video—can be processed onboard, video overlays can be added A feature and advantage of embodiments of the invention over known throwable robots is an elimination of vignetting—Previous robots could have vignetting in the image caused by alignment of the image sensor within the camera and the hole in the protective shell. By integrating the lens into the clamshell, this problem has been eliminated.

A feature and advantage of embodiments of the invention over known throwable robots is a significantly increased processing power (can now process video onboard, potential for increased autonomy).

A feature and advantage of embodiments of the invention over known throwable robots that contributes to the modularity, is that all major components connect through board to board connectors. With the exception of coaxial cables to the antennas and the wires on the leads of the motors and the charge plug, all wire harnesses have been eliminated. There is no longer any soldering required in final assembly (only on PCB population).

DESCRIPTION OF THE FIGURES

FIG. 3 is an exploded view of the rearward clamshell part illustrating the batteries and brackets.

FIG. 4 is an exploded view of the forward clamshell part.

FIG. 5 is an elevational view of the forward clamshell part with a printed circuit board therein.

Figure 1:
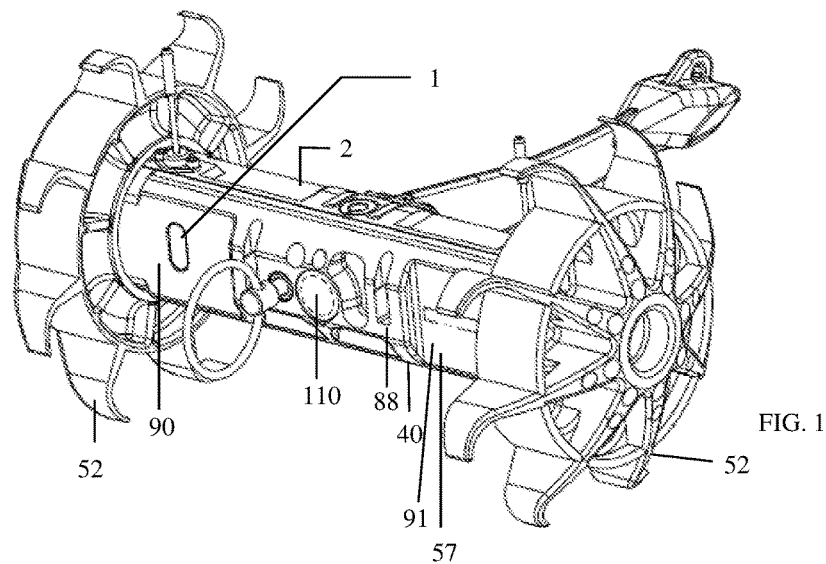
FIG. 1 is a front perspective view of a throwable robot according to the inventions herein.
Figure 2:
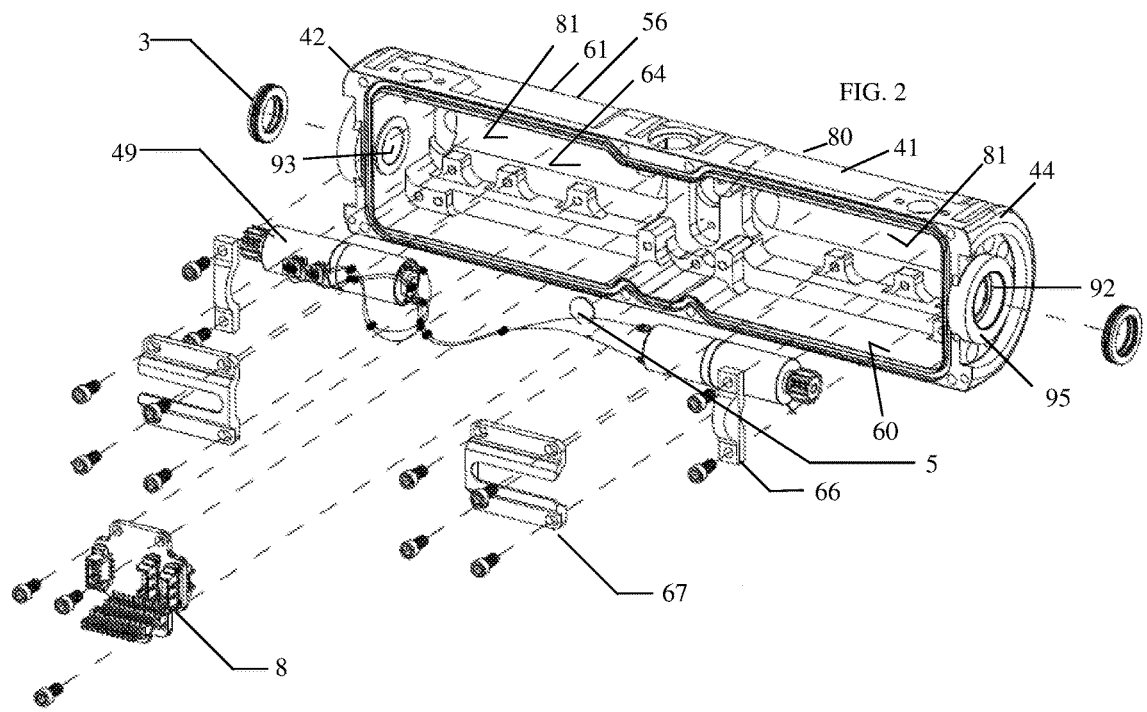
FIG. 2 is an exploded view of the rearward clamshell part illustrating motors and brackets.
Figure 6:
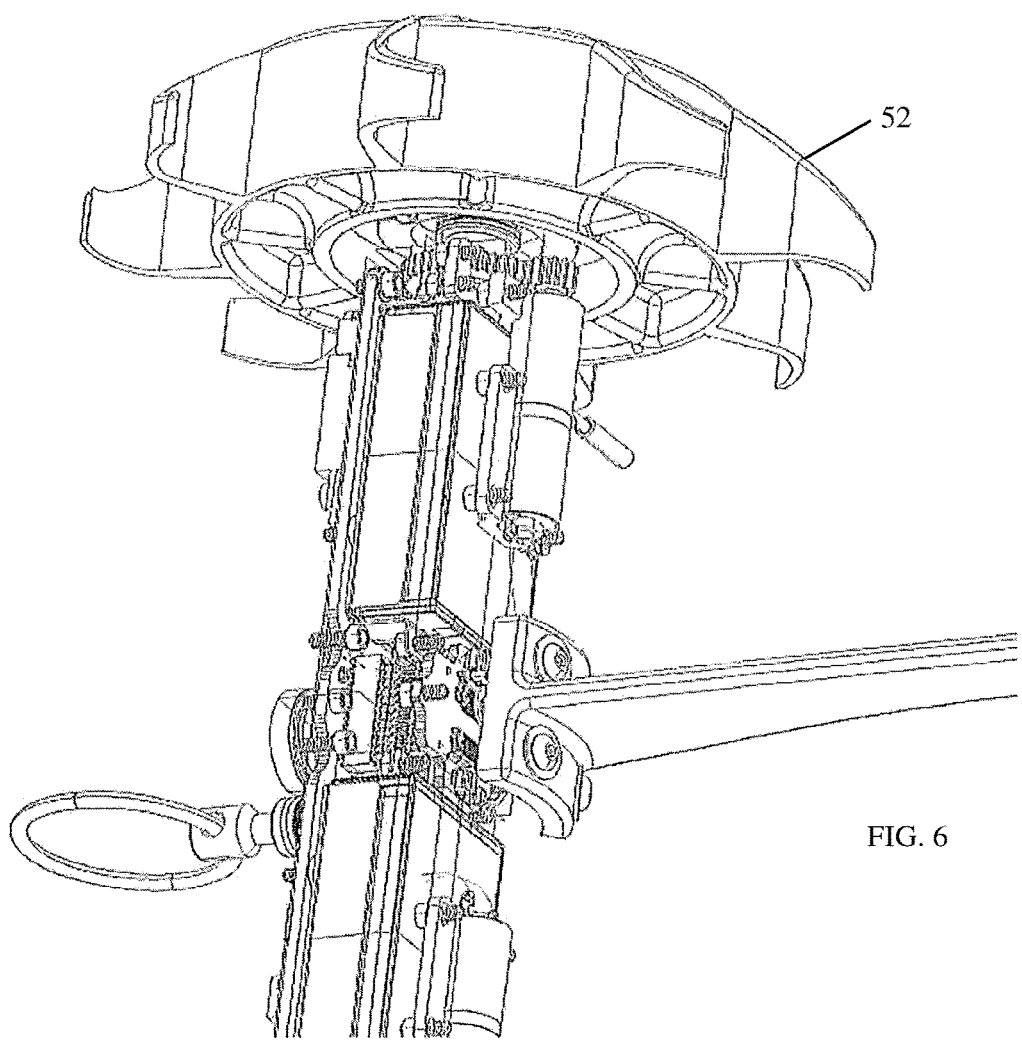
FIG. 6 is a partial plan view of the robot of FIG. 1 with the chassis removed illustrating the arrangement of the components.
Figure 7:
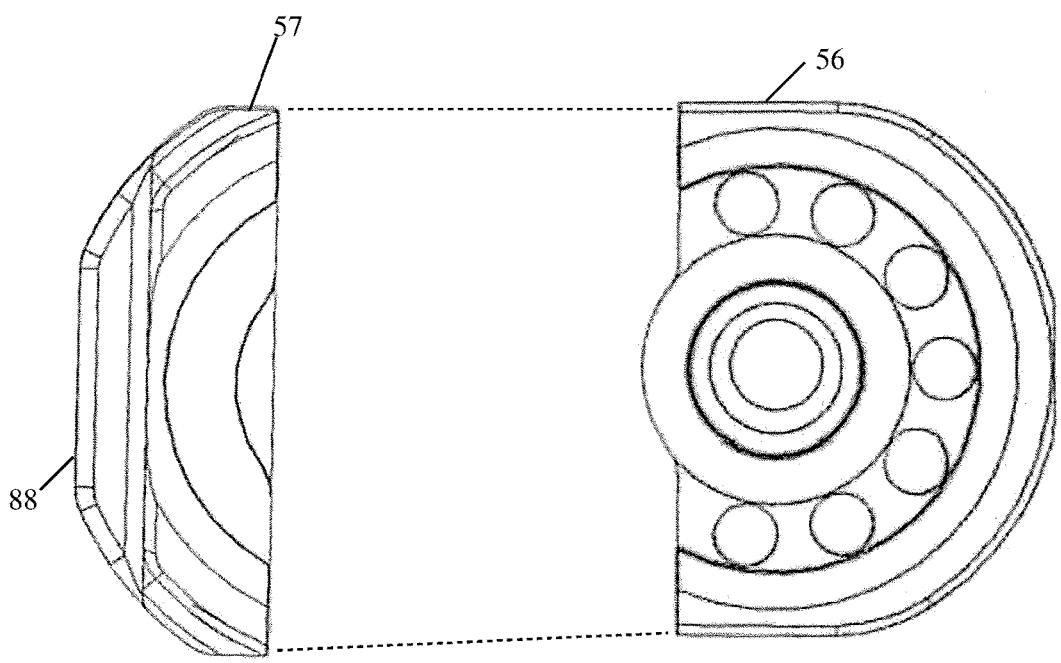
FIG. 7 is an end view of the chassis clamshell parts.
Figure 8:
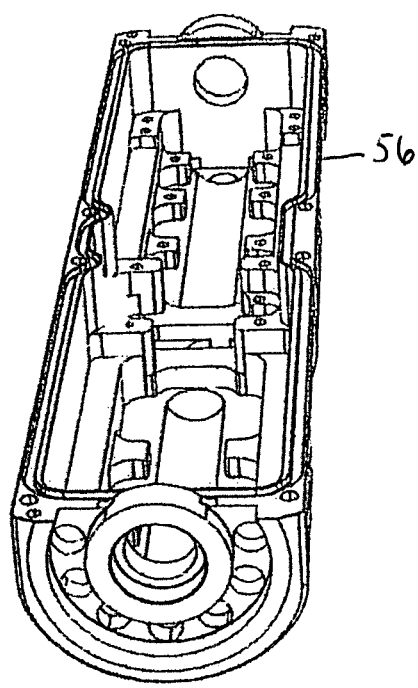
FIG. 8 is a perspective view of the deeper recess clamshell part without components.
Figure 9:
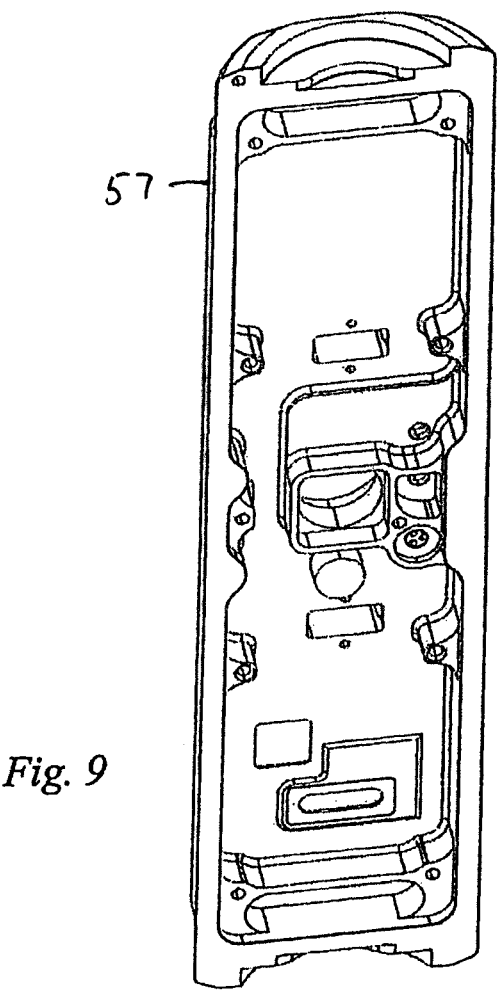
FIG. 9 is a perspective view of the shallow recess clamshell part without components.

ELEMENT NOS.

1—Chassis Front
2—Chassis Back
3—Shaft Seal (2)
49—Motor (2)
5—GoreVent (for pressurization), (for microphone port, not visible in assembly)
66—Front Motor Bracket (2)
67—Back Motor Bracket (2)
8—Interface PCB
9—Antenna Assembly (2)
10—Cartridge Assembly (2)
11—Clutch Plate (2)
12—Clutch Assembly (2)
13—E-ring (2)
74—Battery (2)
15—Battery Holder (2)
16—Gasket
17—PhotoVoltaic (light sensor) port
18—E-ink Display
19—LED Illuminators (5)
20—PhotoVoltaic Window
21—Camera lens
22—LED Window
23—E-ink Window
24—Camera Window
25—Spring (canted coil, for pin retention)
26—Spring Groove Insert
27—Magnetic Switch Pin Assembly
28—Main PCB

DETAILED DESCRIPTION

A two wheeled throwable robot comprises an elongate chassis 40 with two ends 42, 44 and with exteriorly exposed surface 41, a motor 49 at each end, drive wheels 52 connected to the motors, and a tail extending from the elongate chassis. The chassis split length wise and comprised of a pair of elongate portions, a rearward portion 56 and a forward portion 57. The rearward portion having a C-shape cross section with exteriorly exposed flattened portions 60, 61. The rearward portion having recesses 64 and brackets 66, 67 for containing and securing the pair of motors 49, recesses defined at each end including at the motors for receiving a pair of batteries 74. Adjoining respective surfaces 75, 76 join with a gasket or sealing material therebetween.

The chassis is generally cylindrical with modified surfaces and is split, looking at an end, in a vertical chord forward of the axis of the modified cylinder. This provides a clamshell part 80 with deeper recesses 81 for the motors and batteries, the high volume components, and a shallow clamshell part 82 with a shallow recess 83 that retains the main printed circuit board 28. A feature and advantage of the layout is the vulnerable PCB 28 is secured in the forward portion 57, a shallow component, that has a high degree of structural strength with a central region 88 projecting forward and flattened forward facing end portions 90, 91.

Moreover the rearward deeper clamshell part has two openings 92, 93 for the wheel shafts entirely contained within the ends of the deeper clamshell. Additionally, in embodiments, an annular bushing 95, unitary with the deeper clamshell part, is entirely included and extends towards and cooperatively engages the forward shallow clamshell part in a recess 97. A feature and advantage of this structure is that it provides enhanced sheer resistance at the clamshell juncture whilst providing enhanced wheel shaft support.

The robot described here is one incorporating video, audio, and light sensing with improved environmental sealing. The two-piece unitary chassis with a protective shell and blister have been replaced with a clamshell design. This reduces the number of interfaces to seal from 38 down to 12. The microphone, light sensor, LED illuminators 19, and blind hole 102 for the activation pin 105 from the prior art robot blister have been moved to the front half of the clamshell design while the charge port has been located in the rear half of the clamshell. The microphone port is sealed with an acoustic waterproof vent, rated to IP67, provided by W. L. Gore. The charging jack is IP67 rated unmated and has additional circuitry which will prevent the battery from short-circuiting across the charge jack terminals, which may happen, for example, if it is exposed to saltwater. This circuitry is deactivated when the robot is off because the battery's circuitry itself will ensure the battery is protected. The illumination LEDs, 19 light sensor, and e-ink display are covered with windows with clear VHB double-sided tape. The clamshell halves are held together by screws with an elastomeric gasket 16 in between the two halves for sealing.

By switching to the clamshell design, increased volume has been made available without a significant increase in size. Accommodations have been made to support two battery packs to support increase power draw of new electronics and increase runtimes. In addition, the motors now mount directly to the rear of the clamshell. This provides heatsinking and additional volume has been left to accommodate other models of motors (brushed with increased torque, brushless motors, etc). The motor clamping has been revamped with a two piece hold down which is an improvement over the prior art throwable robots, which was cantilevered, resulting in high bending stress on the screws and a relatively unreliable clamp.

There is a micro-clutch assembly 12 built onto the axle. End caps have been eliminated and integrated into the main clamshell housing. Like before, spring-energized seals from Bal-Seal are employed for the shafts. Combined, this reduces part count and potential water and dust ingress. The shape of the shafts have been modified now to ensure the shaft seal only contacts smooth edges during the installation of the clutch assembly.

The electronics have been reconfigured to fit on a single primary board assembly (PCB). This primary board has an integrated camera 110, microcontrollers, microphones, photovoltaic light sensor 17 (used to determine when to activate LEDs), LEDs, hall-effect sensor (for activation via magnet embedded into the actuation pin 105), an industry standard modular radio interface connector, battery management, processing interface (presently an interface to a system on a module (SOM) that mounts as a daughter board), a breakout the "interface board"—a $2^{nd}$ daughter board (which provides interfaces for the charge receptacle, brushed and brushless motors, and the dual battery configuration), gyroscopes, accelerometers, magnetometers, an e-ink display, and battery management system. This board also provides filter circuitry to selectively reduce motor noise which can be selectively enabled or disabled based on the robots motion.

Due to the camera sensor being directly integrated into the main PCB, the lens for the camera has been integrated into the front half of the clamshell. This lens is sealed in to prevent ingress of water or dust. A protective sticker can be used to protect against scratching. Previously the antennas were whip antennas made from braided steel cables coated in plastic. The whip design is critical to get the signal away from ground effects, but still possible to deform upon impact. Two antennas mounting points have been developed. The first is front-mounted and provides increased ease of assembly. The second is top mounted and provides for increased height and eliminates a portion of the robot from blocking the antenna signal and introducing directionality. In both cases, there is support for diversity or MIMO communication through the use of multiple antennas. Two antenna designs were considered. The first is a conformal antenna that wraps around the front portion of the body. The second is a whip made of a special blend of Nitinol, a shape memory alloy. Superior range has been achieved with the Nitinol whips. The properties of Nitinol are appealing as they can deform on impact and then return upright when the robot self-rights where previous whip antennas would drag on the ground and cause variability in range. Previous antennas were crimped onto a threaded fastener which were then screwed into place. Adhesives were then applied to prevent moisture ingress. The new antennas utilize a cartridge approach which has a small PCB th matching circuitry and a pin receptacle mounted on a cartridge that is inserted from the top of the robot and held in place with an e-ring. A pin is crimped onto the Nitinol braid and a cap is fit around an insulator that is fit around the antenna. Silicone is used to seal the top of the cap. These antennas can be replaced in the field by removing two external screws and sliding an antenna out. A feature and advantage of embodiments of the invention over known throwable robots that contributes to the modularity, is that all major components connect through board to board connectors. A feature and advantage of embodiments of the invention over known throwable robots that contributes to the modularity, is that all major components connect through board to board connectors.

In embodiments the robot wheels are less than 6 inches in diameter. In embodiments, less than 5 inches. In embodiments, less than 4 inches. In embodiments, the robot weighs less than 5 pounds. The features of the robot of Publication U.S.20100152922 may be incorporated in the robot claimed and described herein. Said reference is incorporated by reference herein.

We claim:

1. A two wheeled throwable robot comprising:
   an elongate chassis defining an interior, the chassis having an outwardly exposed surface extending around the chassis and comprising a forward portion and a rearward portion, the rearward portion having a pair of closed ends and having a C-shaped cross-section inwardly from the pair of ends and with a forward facing open front, the forward portion having a pair of ends, being configured for closing the open front, having a central region, and a pair of flattened forward facing portions on each lateral side of the central region;
   a pair of motors, one positioned toward each end of the rearward portion and secured in place with brackets attached to the rearward portion;
   a battery secured in the rearward portion;
   a printed circuit board with control circuitry therein secured to the forward portion;
   a pair of wheels attached to each end of the rearward portion of the chassis, each of the pair of wheels connected to one of the motors through a clutch assembly; and
   a tail extending from the elongate chassis.

2. The two wheeled throwable robot of claim 1 wherein the forward portion of the chassis has a shallow recess compared to a recess in the rearward portion and the printed circuit board is secured therein.

3. The two wheeled throwable robot of claim 1 wherein the printed circuit board has a camera attached thereto and positioned at an opening in the forward portion of the chassis.

4. The two wheeled throwable robot of claim 3 wherein the chassis has a camera lens secured to the chassis at the opening.

5. The two wheeled throwable robot of claim 4 wherein the printed circuit board has a microphone, a photovoltaic sensor, and illumination LED's attached thereto.

6. The two wheeled throwable robot of claim 1 wherein each of the wheels is less than 6 inches in diameter.

7. The two wheeled throwable robot of claim 6 wherein each wheel has a shaft extending through an aperture in the rearward portion, each shaft sealed with a shaft seal.

8. The two wheeled throwable robot of claim 7 wherein the forward portion and the rearward portion of the chassis are sealed together.

9. The two wheeled throwable robot of claim 1 further comprising an antenna cartridge inserted into an aperture in the outwardly exposed surface of the rearward portion of the chassis.

10. The two wheeled throwable robot of claim 9 further comprising a second antenna cartridge inserted into another aperture in the outwardly exposed surface of the rearward portion of the chassis.

11. The two wheeled throwable robot of claim 1 wherein a camera, a light sensor, and a plurality of illumination LED's are attached to the printed circuit board.

12. A two wheeled throwable robot comprising:
    an elongate chassis defining an interior and providing an exteriorly exposed surface, the chassis comprising a clam shell shape with a forward portion and a rearward portion, the rearward portion having a pair of ends and having a C-shape cross section inwardly of the ends, the rearward portion having a forward facing open front, the forward portion closing the open front and having a recess, wherein the forward portion and rearward portion define an interior, the rearward portion having a deeper recess that the recess of the forward portion;
    a pair of motors, one of the pair of motors positioned in each end of the rearward portion and secured in place in the rearward portion;
    a pair of batteries secured in the rearward portion;
    a printed circuit board with control circuitry secured within the chassis in the interior;
    a pair of wheels attached to each end of the rearward portion of the chassis, each of the pair of wheels connected to one of the motors through a clutch assembly; and
    a tail extending from the elongate chassis.

13. The two wheeled throwable robot of claim 12 wherein the printed circuit board has a camera attached thereto and positioned at an opening in the forward portion of the chassis, the opening having a lens secured thereto.

14. The two wheeled throwable robot of claim 12 wherein the printed circuit board has a microphone and a photovoltaic sensor attached thereto end and each positioned at openings in the forward portion of the chassis.

15. The two wheeled throwable robot of claim 12 wherein each of the pair of wheels is less than 6 inches in diameter.

* * * * *